United States Patent [19]

Bensel, III et al.

[11] Patent Number: 5,185,844
[45] Date of Patent: Feb. 9, 1993

[54] CLOSURE FOR OPTICAL FIBER CONNECTIVE ARRANGEMENTS AND METHOD OF PROVIDING SAME

[75] Inventors: William H. Bensel, III, Lawrenceville; Gary S. Cobb, Norcross, both of Ga.

[73] Assignee: AT&T Bell Laboratories, Murray Hill, N.J.

[21] Appl. No.: 736,850

[22] Filed: Jul. 29, 1991

[51] Int. Cl.⁵ ............................................. G02B 6/26
[52] U.S. Cl. .................................... 385/135; 385/99; 385/136
[58] Field of Search .................. 385/56, 59, 66, 69, 385/71, 135, 134, 136, 101, 110, 111, 99

[56] References Cited

U.S. PATENT DOCUMENTS

| | | | |
|---|---|---|---|
| 4,252,405 | 2/1981 | Oldham | 385/135 |
| 4,332,435 | 6/1982 | Post | 385/135 |
| 4,359,262 | 6/1982 | Dolan | 385/135 |
| 4,428,645 | 1/1984 | Korbelak | 385/135 |
| 4,516,830 | 5/1985 | Guazzo | 385/135 |
| 4,664,471 | 5/1987 | Mignien et al. | 385/135 |
| 4,746,187 | 5/1988 | Flores | 385/135 |
| 4,753,499 | 6/1988 | Malkani | 385/135 |
| 4,784,459 | 11/1988 | Jenkins | 385/135 |
| 4,805,979 | 2/1989 | Bossard et al. | 385/135 |
| 4,820,007 | 4/1989 | Ross | 385/135 |
| 4,927,227 | 5/1990 | Bensel | 385/135 |
| 4,958,903 | 9/1990 | Cobb et al. | 385/135 |
| 4,961,623 | 10/1990 | Midkiff et al. | 385/135 |
| 5,042,901 | 8/1991 | Merriken et al. | 385/135 |
| 5,048,921 | 9/1991 | Jones et al. | 385/69 |
| 5,092,663 | 3/1992 | Hivner | 385/135 |
| 5,093,886 | 3/1992 | Smoker et al. | 385/135 |

*Primary Examiner*—Brian Healy
*Attorney, Agent, or Firm*—E. W. Somers

[57] ABSTRACT

An optical fiber closure (20) which is particularly suitable for connecting small fiber count cables and for repairs of same includes a longitudinally extending electrical bonding and support member (70) for supporting in-line connections between optical fibers of cable end portions which enter the closure from opposite ends thereof. Each cable end portion extends through a cable and clamping and sealing means (40) which is adapted to become secured to a tubular member (60) in which is disposed the support member and which is adapted to provide sealed engagement with the entering cable end portion to prevent the ingress of moisture.

17 Claims, 2 Drawing Sheets

CLOSURE FOR OPTICAL FIBER CONNECTIVE ARRANGEMENTS AND METHOD OF PROVIDING SAME

TECHNICAL FIELD

This invention relates to a closure for optical fiber connective arrangements. More particularly, the invention relates to an optical fiber closure which may be used in the repair of optical fiber drops to the home or in local area networks in buildings, for example.

BACKGROUND OF THE INVENTION

The use of communication cables which include a plurality of optical fibers is rapidly expanding. An optical fiber cable may comprise a plurality of glass fibers each of which is protected by at least one layer of a coating material. The optical fibers may be assembled into units in which the fibers are held together by binder ribbons to provide a core. In one manufacturer's line of cables, the core is enclosed by a plastic tube and a plastic jacket.

Whatever the structure of a cable, there must be provisions for connecting, such as by splicing, transmission media at an end of a given length of cable to corresponding transmission media at an adjacent end of another length of cable. It is conventional to use a closure, within which all conductors are connected, wrapped and stored and protected environmentally.

During the connection of metallic conductors, it is customary to bend sharply the conductors, to provide access to other connections. The physical nature of glass optical fibers forecloses the adoption of connectorization techniques which are used with metallic conductors within such a closure. Because of their small size and relative fragility, special considerations must be given to the handling of optical fibers in closures. Transmission capabilities may be impaired if an optical fiber is bent beyond an allowable bending radius, the point at which light no longer is totally contained in the core of the fiber. Furthermore, expected lives of the fibers will be reduced if bent to less than the minimum bending radius. Generally, the radius to which the optical fiber can be bent without affecting orderly transmission is substantially greater than that radius at which the optical fiber will break. Whereas glass and silica, the materials used to make optical fibers, are in some respects stronger than steel, optical fibers normally do not possess this potential strength because of microscopic surface fractures, which are vulnerable to stress and spread, causing the fiber to break easily.

It should be clear that, an optical fiber cable does not lend itself to connecting practices of wire-like communication conductors. The individual glass fibers cannot just be twisted, tied, wrapped and moved into a closure, in anything like the manner of wire-like metallic conductor cables. These small diameter glass fibers cannot be crimped or bent at small angles, without breakage. Inasmuch as glass fibers have memory and tend to return to a straight-line orientation, placement in a closure becomes somewhat difficult. Moreover, the interconnection of optical fibers is a precision operation which is somewhat difficult to perform within a manhole, or at pole-suspension elevation, for example. What is needed is a closure in which connected optical fibers have at least a minimum bend radius or, preferably, no substantial curvature.

Also, there is a need for a closure which is particularly suitable for the fiber-in-the-loop market and to splice relatively small count optical fiber cables some of which are referred to as drop cables. Drop cables are those cables which extend from distribution cables at the street to the premises. For such a use, what is sought after is a closure that is relatively inexpensive to serve this potentially very large market. Also, desirably, the sought after closure is relatively small in size yet able to accommodate a suitable number of splices for fiber-in-the-loop.

As might be expected, fiber closures are available in the prior art. Some of these prior art closures have shortcomings insofar as being used in the fiber-in-the-loop market.

In the prior art, fiber slack normally has been provided adjacent to connective arrangements. When splicing optical fibers by mechanical means or by fusion, it becomes necessary to provide enough slack fiber so that the fiber can be pulled out of a closure and positioned in apparatus for the preparation of fiber ends and the joining together. This typically has required that at least about 0.5 meter of fiber from each cable be stored in the splice closure when the closure is sealed, that is when the splicing has been completed. There must be a method of storing this slack which usually requires inducing curvature no less than the minimum bend radius of about 3.7 to 5 cm in the fibers, of protecting the splices and of keeping the fibers together in an orderly manner. The need to store the slack further complicates the problem of providing a suitable optical fiber closure. Some prior art closures have included organizers which have tended to place higher than desired stresses on the optical fibers, resulting in fiber damage.

In another closure, a tubular cover having a closed end and an open end is adapted to receive and be sealed to a cable termination assembly. The cable termination assembly includes cable entry facilities through which the cables to be spliced are routed. A support member extends from the cable entry facilities and has a free end disposed adjacent to the closed end of the cover. The support member includes a support base for supporting an optical fiber breakout and a plurality of optical fiber splice trays.

Mounted centrally of each tray is at least one organizing module each of which is capable of holding a plurality of optical fiber connective arrangements. Each module is such that it is capable of accommodating different kinds of connective arrangements such as, for example, fusion splices and mechanical splices, both polished and non-polished. Each tray is capable of holding a plurality of organizing modules which may be added as needed. Although this last-described closure has enhanced storage capability both in number and in kind, which is ideal for high density applications, it is larger and has more storage capability than is needed for some applications in fiber-in-the-loop and for splicing small fiber count cables.

Further, the sought-after closure should be suitable for repair operations to optical fiber drops in fiber-to-the-home installations, for example. Typically, in such installations, an optical fiber drop cable which has been cut or damaged must be repaired. One alternative is to run another length of optical fiber cable from the street to the premises. Another approach would be to remove a portion of the damaged cable on each side of the break and to splice in a new, short length. The latter approach only becomes feasible if closures used at each end of the new, short length for splicing to the priorly installed cable are economical in cost.

The prior art includes at least one drop repair closure. See U.S. Pat. No. 4,820,007 which issued on Apr. 11, 1989 in the names of R. R. Ross and I. Vedejs. In it, a splice tray includes provisions on one side for holding optical fiber splices and metallic conductor splices on an opposite side. An electrical bonding and gripping assembly is adapted to be mounted on the splice tray. The closure also includes mating cover portions which are moved into engagement with each other to enclose the tray. Also, a waterblocking encapsulant may be introduced into the closure.

The last described prior art drop repair closure is designed primarily for mechanical and fusion splices which require long lengths of fiber slack for splicing and bend radius controllers. Because of the amount of slack, a fiber organizer and splice holder are required for storage of slack fiber. Also, it has a relatively large size compared to the transverse cross section of cables which are spliced therein. As such, it is more vulnerable than desired to repeated engagement by excavation tools. Further, because of its relatively large size compared to the cables to be spliced therein, the amount of encapsulant necessary to fill it is relatively large. Gripping of the cables at the ends of the closure is accomplished with the same assembly which is used for bonding. Lastly, the only effective barrier to moisture ingress is the encapsulant.

What is sought-after and seemingly what does not appear in the prior art is a closure which is relatively small and what is suitable for drop cable repair installations. The sought after closure must include facilities for carrying electrical continuity and cable strength across connective arrangements and, of course, must not introduce excessive bending into the optical fiber.

SUMMARY OF THE INVENTION

The foregoing problems of the prior art have been overcome by the optical fiber closure of this invention. An optical fiber closure for holding connections between optical fibers of one cable and optical fiber of another cable comprises a longitudinally extending member for supporting fibers of the cables to be spliced and, at least one optical fiber connective means which is supported by the longitudinally extending member. A tubular member in which is disposed the support member is provided. The tubular member has an internal cross section normal to a longitudinal axis of the closure. The largest dimension of the cross section being less than the product of two and a predetermined minimum radius of a path in which the fiber may be routed to avoid excessive static fatigue stress to preclude any optical fiber being disposed in a path which includes at least a semi-circular loop having the predetermined minimum radius. A cable gripping and sealing assembly is disposed at each end of the tubular member and secured thereto for providing passage of a cable end portion into the tubular member and for providing a clamping, sealing engagement with the cable end portion to prevent the ingress of moisture into the closure.

Advantageously, there is substantially no slack in any of the connected fiber lengths. The closure is relatively small, thereby requiring less encapsulant to fill and has a cross section transverse of a longitudinal axis of the closure which is not substantially larger than that of the cables which extend into the closure.

The electrical bonding and support member functions also as a gauging member. When the end portions of the cable are secured thereto after the fibers have been connected, the fibers are not taut but have substantially no slack.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
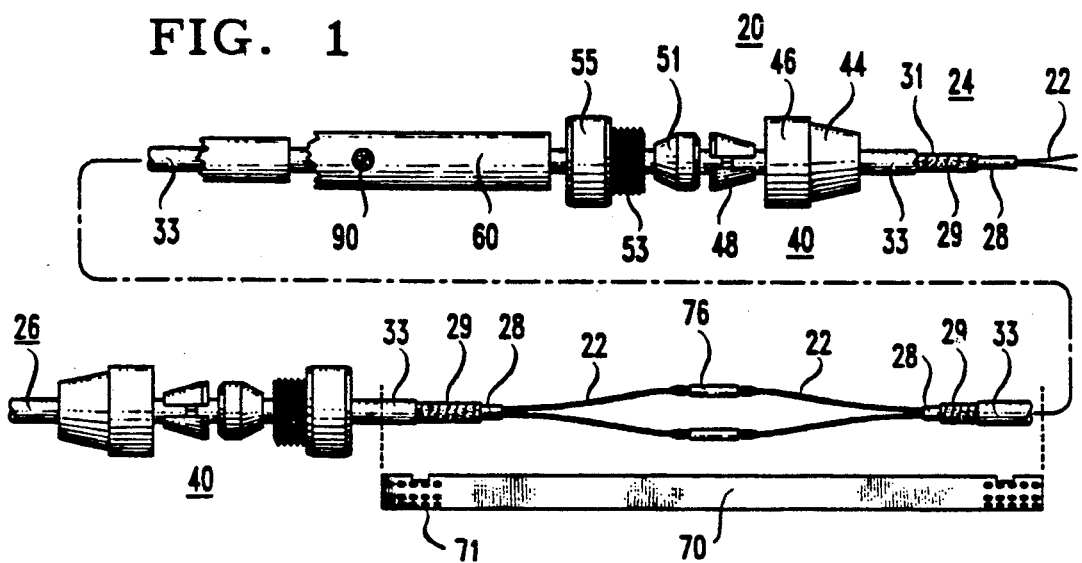
FIG. 1 is a front elevational exploded view of an optical fiber closure of this invention.
Figure 2:
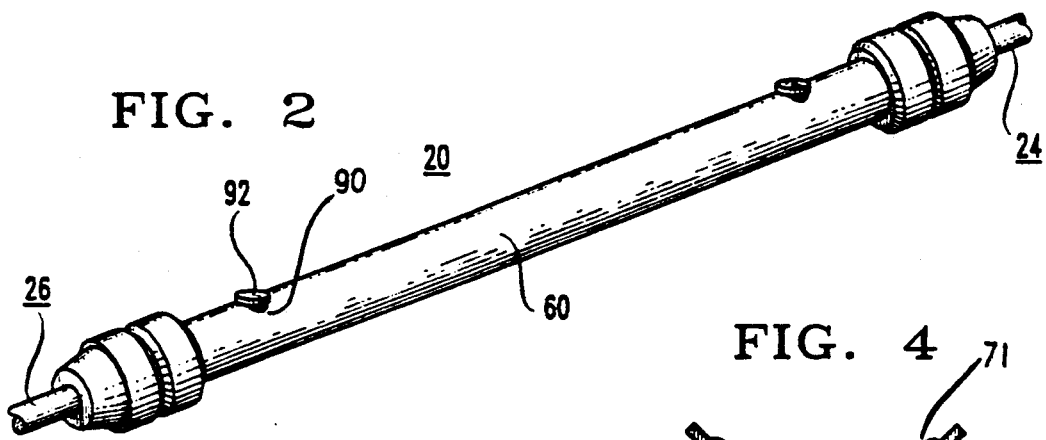
FIG. 2 is a perspective view of the optical fiber closure of FIG. 1 after it has been assembled.

Referring now to FIGS. 1 and 2 there is shown an optical fiber closure of this invention which is designated generally by the numeral 20. The closure 20 is adapted to provide an enclosure in which optical fibers 22-22 of an optical fiber cable 24 are spliced to optical fibers of another optical fiber cable 26. In each cable, the optical fibers 22-22 comprise a core which is disposed in a core tube 28. About the core tube 28 typically is wrapped a metallic shield 29 which is corrugated and which has an overlapped seam 31. A plastic jacket 33 is disposed about the metallic shield 29.

Figure 3:
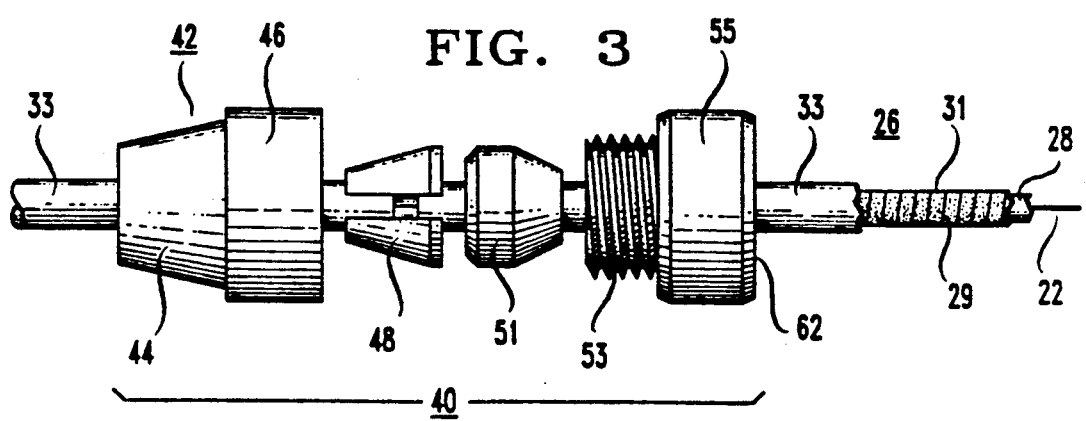
FIG. 3 is an enlarged view of a cable clamping and sealing assembly disposed at each end of the closure.

An end portion of the cable 24 extends through a cable sheath gripping and sealing assembly designated generally by the numeral 40 see FIGS. 1 and 3). The cable sheath gripping and sealing assembly 40 includes a collar 42 having a truncated conically shaped portion 44 and a cylindrically shaped portion 46 which is threaded internally. A collet grip portion 48 is adapted to have the cable end portion extend therethrough as is a grommet 51. The grommet 51 is made of a neoprene or other suitable elastomeric material and has a truncated conical shape such that a small diameter portion thereof is adapted to be received in an externally threaded end portion 53 of an adapter 55. The externally threaded end of the adapter 55 is adapted to be received in the internally threaded end of the collar 42.

Connected to the cable sheath gripping and sealing assembly 40 is a housing 60 (see FIGS. 1 and 2) in the form of a tubular member. The housing 60 is an elongated tubular member having outer and inner diameters of about 2.5 and 2.2 cm, respectively, and being made of a suitable plastic material. An end portion of the housing 60 is adapted to become secured within an enlarged unthreaded portion 62 (see FIG. 3) of the adapter 55, thereby providing a watertight seal. An adhesive material may be used to secure the end portion of the housing 60 within an adapter 55, thereby providing a watertight seal.

Figure 4:
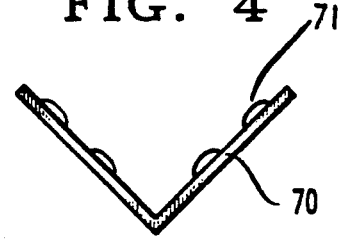
FIG. 4 is an end view of an electrical bonding and support member.

Disposed within the housing 60 is a longitudinally extending electrical bonding and support member 70 (see FIGS. 1 and 4). The bonding and support member 70 which extends generally collinearly with the housing 60 has a dual function. First, it is adapted to support optical fibers 22-22 of the cables which extend into the closure and to support connections therebetween. Secondly, the member 70 functions as an electrical bonding member to carry electrical continuity across the connections from a metallic shield portion of one cable to a metallic shield portion of the other cable. In a preferred embodiment, the bonding and support member 70 is made of metal, has a V-shaped cross section (see FIG. 4) transverse to a longitudinal axis of the closure and has a length of about 37 cm. Also, as can be seen in FIGS. 1 and 4, inner surfaces of the end portions of the member 70 are provided with upstanding portions 71-71 to enhance gripping of jacketed cable portions which extend into member 70.

The closure 20 is completed with a second cable gripping and sealing assembly 40 which is caused to grip the end portion of the cable 26 and which has its adapter 55 secured to an opposite end of the housing 60.

In using the closure 20, a craftsperson prepares an end portion of each of the cables to be connected by exposing a predetermined length of the optical fibers of each (see FIG. 3). This requires that the jacket 33 be removed from an end portion which typically is about 17.8 cm in length. Afterwards, the corrugated metal shield is removed from the endmost 15.8 cm of that end portion followed by removal of the endmost 15.2 cm of the core tube. As a result, each prepared end portion of a cable to be spliced has about 15.2 cm of exposed fibers, about 0.6 cm of exposed core tube and about 1.9 cm of exposed metallic shield.

Afterwards, the craftsperson moves unassembled portions of a cable gripping and sealing assembly 40 over the end portion of a first cable, which in this instance is the cable 26, for a distance which is sufficient then to move slidably a housing 60 onto the first one of the cables to be spliced. Similarly, the unassembled portions of a cable gripping and sealing assembly 40 are moved over the end portion of a second cable, which in this instance is the cable 24, that is to be spliced to the first. This is accomplished in a manner such that the elements of each assembly are oriented with respect to its associated cable end portion as shown in FIGS. 1 and 3.

Figure 5:
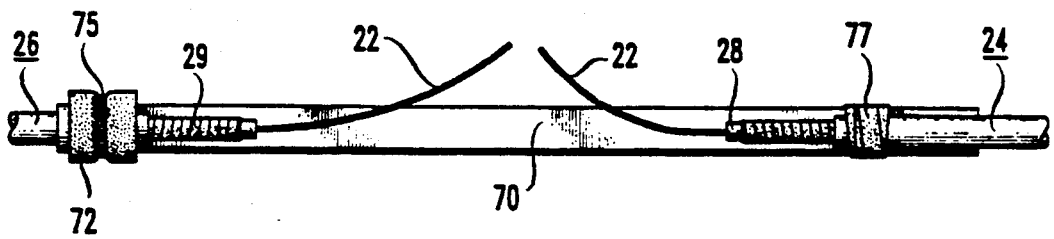
FIG. 5 is a front elevational view of portions of the closure and of end portions of cables prior to the cables being connected.

Then the craftsperson positions the first of left hand cable 26 as viewed in FIG. 5 such that about 2.5 cm of the jacketed portion extends into a left hand end of the bonding and support member 70. Three turns of a vinyl adhesive tape 72 are wrapped about the jacketed portion of the end portion of the cable 26 and the bonding and support member 70 (see FIG. 5). A tie 75 is wrapped about the tape to secure the tape to the jacketed portion of the cable 26 and to the left end portion of the bonding and support member 70.

Next, the craftsperson positions the other or second cable 24, the right hand cable end portion as viewed in FIG. 5, such that about 6.4 cm of the jacketed end portion is positioned in the bonding and supporting member 70. As with the other cable, three turns of an adhesive vinyl tape 77 are used to secure this cable end portion to the supporting an bonding member; however unlike for the cable 26, the securement of the cable 24 is only temporary. By positioning more of the end portion of the right hand cable 24 in the member 70, the end portions of the exposed fibers of the two cables overlap and sufficient slack length of the fibers are disposed within the bonding and support member to facilitate splicing.

The craftsperson positions the bonding and support member 70 with respect to apparatus (not shown) which is used to connect fibers of the cable 26 to fibers of the cable 24 with connective arrangements 76-76. Such splices may be made by using AT&T's CSL Lightsplice ™ fiber optic splice such as is disclosed in appln. Ser. No. 07/682,888 filed on Apr. 8, 1991, bending. The slack in the fibers allows portions of them to be moved outside the member 70 so that the splicing operation may be performed.

The three turns of adhesive tape 77 are removed from the right hand cable end portion and the right hand cable 24 is moved to the right as viewed in FIG. 5 while the fibers and splices are repositioned in the support member. Care is taken so that the fibers are not taut. Then, turns of an adhesive tape 78 (see FIG. 6) are wrapped about the jacketed portion of cable 24 and the right hand end (as viewed in FIG. 6) of the support member 70 and a tie wrap 79 applied to secure the jacketed portion to the support member.

Figure 6:
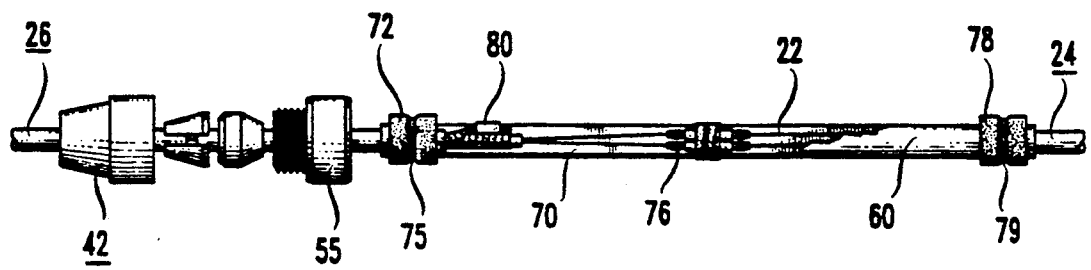
FIG. 6 is a front elevational view of the closure of FIG. 1 which depicts optical fiber connective arrangements supported within the electrical bonding and support member which extends between two opposed cable clamping and sealing end portions.
Figure 7:
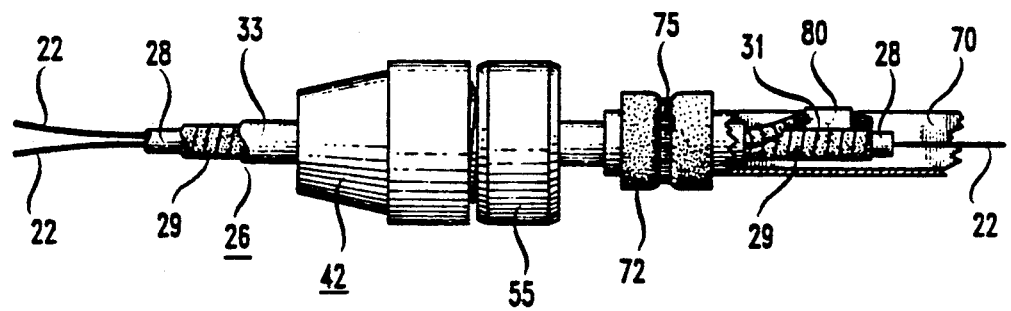
FIG. 7 is an enlarged view of one of the end portions after it has been caused to become disposed in clamping and sealing engagement with a cable end portion.

In a next step of using the closure 20, the craftsperson separates an overlapped portion 29 of the corrugated shield portion of the cable 26 which is exposed within the support member 70 and positions that overlapped portion in engagement with the bonding and support member 70 (see FIGS. 6 and 7). An electrical bonding clip 80 (see FIGS. 4 and 5) is caused to be disposed on the portion of the metallic shield and over an edge portion of the bonding and support member 70 to hold the portion of the shield in electrical engagement with the bonding and support member. This step is repeated for the end portion of the cable 24 at an opposite end of the member 70.

Then the housing 60 is moved slidably along the cable 26 over the bonding and support member 70 and an adhesive material applied about an outer surface of each end portion thereof. The threaded adapters 55-55 are moved slidably to cause each end of the housing 60 to be received in the enlarged unthreaded end 62 of an adapter. Afterwards, the grommet, collet grip and collar of each cable gripping and sealing the assembly are moved to cause the grommet and grip to be received in the adapter. The collar 42 is turned threadably onto the associated adapter to cause the grommet and grip to become disposed in compressive engagement with the cable extending therethrough to seal the cable against the ingress of moisture.

Figure 8:
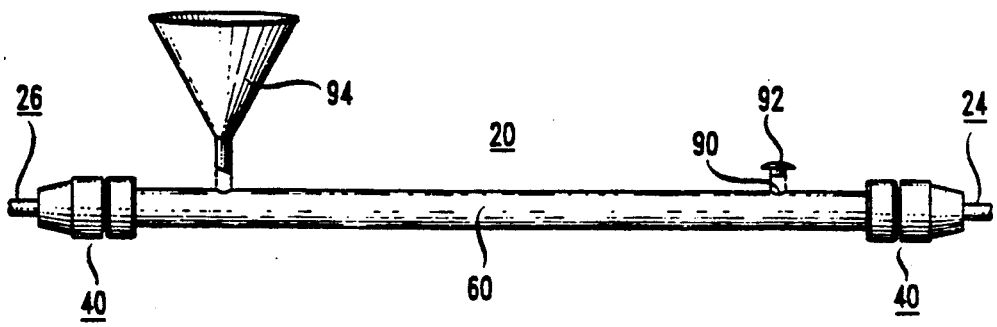
FIG. 8 is a front elevational view of the closure of FIG. 1 after it has been assembled and illustrating the step of introducing an encapsulating material into the closure.

As can be seen in FIGS. 1, 2 and 8, the housing 60 also is provided with several access ports 90-90. After the closure has been assembled, the craftsperson may remove a plug 92 from each port 90 and position a feed end of a funnel 94 (see FIG. 8) in the port. A suitable encapsulant material such as AT&T D1000 encapsulant, for example, then is introduced into the closure 20 to provide additional waterblocking capability.

Advantageously, the closure 20 of this invention is one in which there is very little slack in the optical fibers. No bend radius controllers are necessary. There is no substantial intended curvature in any of the associated connected pairs of optical fibers. Indeed the length of each associated connected pair of fibers within the electrical bonding and support member is substantially equal to the length of the electrical bonding and support member. Because the fibers are not taut, there may be some undulations in their paths. What is important is that unlike in prior art closures where fiber organizers, for example, are used and where bend diameters may be as low as in the 7.6 to 10.2 cm range, the only curvature of the fibers in the closure of this invention is that of relatively large radii of curvature indulations.

As a result of the absence of any substantial curvature, there is no diminishing of service life of the fibers because of the closure. Each time a fiber is caused to be bent along an accurate path which is not insignificant, there is some level of stress developed. This together with temperature cycling, humidity and any surface imperfections may lead to failures.

The closure 20 of this invention is referred to as an in-line closure. A cable enters the closure at each end and is substantially aligned with the longitudinal centerline of the closure.

Also, the closure itself has a relatively small profile compared to the cables which are connected therein. The diameter of the housing 60 is relatively close to the diameter of each of the cables to be connected together. In the preferred embodiment, the housing 60 has an outer diameter of 2.5 cm, as mentioned hereinbefore, whereas each of the cables has a diameter of about 1 cm. As such its vulnerability to excavation problems is diminished and the requirements for encapsulant are reduced substantially. The closure of the preferred embodiment is suitably sized for use in the local loop in that it can accommodate four connected fiber pairs.

Contributing to the small size of the closure is the connector which is preferred. It does not require that fiber ends be polished prior to assembly, and it is relatively simple to use to provide a connective arrangement. Accordingly, the apparatus needed to perform the connectorization is relatively uncomplicated and requires only a relatively small length of fiber of each cable be moved outside the electrical bonding and support member 70. When those portions of the lengths which are moved outside the bonding and support member to allow the connecting process to be carried out are repositioned in the support member and moved by removing the temporary securement at the right hand end, as viwed in FIG. 5, not much additional length of support member is required to eliminate the slack. As a result, the length of the closure is not large.

Of course, even with those connective arrangements which require substantial amount of slack, the same assembly procedure and same closure configuration could be used. However, the length of the closure and hence its vulnerability to damage and its requirements for encapsulant would be substantially increased.

The bonding and support member 70 also functions as a gauging member. When the end portion of the cable 26 is secured to one end of the member 70 and the end portion of the cable 24 secured temporarily to the other end, the fibers of the cable which have been prepared with predetermined exposed lengths of the fibers, core tubes shields and jackets are disposed so that the fibers overlap to allow splicing. After splicing, when the end portion of the cable 24 is relocated to the other end of the member 70, the fibers are not taut but are substantially without slack.

The bonding and support member 70 floats mechanically within the closure. It is not used to transfer forces from one cable to the other as in some prior art closures. Rather the transfer of forces is effected through the connection between the cable gripping and sealing assemblies 40-40 and the housing 60.

Also, advantageously, a dual water barrier is provided. Not only is an encapsulant used, but also the cable gripping and sealing assembly at each end of the housing 60 provides excellent sealing against the cable.

It is to be understood that the above-described arrangements are simply illustrative of the invention. Other arrangements may be devised by those skilled in the art which will embody the principles of the invention and fall within the spirit and scope thereof.

We claim:

1. An optical fiber closure for holding connections between optical fiber of one cable which enters the closure at one end thereof and optical fiber of another cable which enters the closure at an opposite end thereof said closure comprising:

a longitudinally extending member for supporting portions of cables to be connected and connective arrangements therefor;

a tubular member in which is disposed said longitudinally extending member, said tubular member having an internal cross section normal to a longitudinal axis of said closure, the largest dimension of the cross section being less than the product of two and a predetermined minimum radius of a path in which optical fiber may be routed without inducing excessive stress into the fiber;

a cable gripping and sealing assembly disposed at each end of said tubular member and secured thereto for allowing a cable end portion to be extended therethrough into said tubular member to allow optical fiber thereof to become disposed in said longitudinally extending member and for providing a clamping, sealing engagement with the cable end portion which extends therethrough to prevent the ingress of moisture into said closure; and at least one optical fiber connective means which is supported by said longitudinally extending member and which is adapted to provide a connective arrangement for two optical fibers which have been extended into said tubular member without any optical fiber being disposed in a path which includes at least a semi-circular loop having the predetermined minimum radius.

2. The optical fiber closure of claim 1, wherein the connected length of two associated fibers between the cable gripping and sealing assemblies is about equal to the distance between the cable gripping and sealing assemblies.

3. The optical fiber closure of claim 1, wherein said longitudinally extending member is adapted to provide electrical continuity across the at least one connective arrangement and to support the fiber connective means.

4. The optical fiber closure of claim 3, wherein said longitudinally extending member is made of a metallic material and has a cross section transverse of a longitudinal axis of the closure which is V-shaped.

5. The optical fiber closure of claim 4, wherein each cable to be spliced includes a metallic shield and a plastic jacket, wherein a portion of the jacketed portion of each cable is adapted to be secured to an end portion of said longitudinally extending member and wherein the metallic shield of the portion of each jacketed end portion is adapted to be connected electrically to an associated end portion of the longitudinally extending member, said closure also including a metallic clip at each end of said longitudinally extending member and which is used to connect an end portion of the metallic shield of an end portion of the cable to the associated end portion of the longitudinally extending member.

6. The optical fiber closure of claim 4, wherein inwardly facing surfaces of end portions of said longitudinally extending member each have projections upstanding therefore to engage a jacket of a cable end portion which extends into said longitudinally extending member.

7. The optical fiber closure of claim 1, wherein said longitudinally extending member has a length which is such that when predetermined portions of the fiber of each cable are exposed and when end portions of the jacketed end portions of the cables are secured to said longitudinally extending member and the fiber of the cables are connected together, there is substantially no slack in any of the spliced fibers.

8. The optical fiber closure of claim 1, wherein said cable gripping and sealing assembly includes an adapter which includes a sleeve portion at one end for receiving an end of the tubular member and which includes an opposite threaded end said cable gripping and sealing assembly also including a grip and a grommet and a collar, said collar adapted to be turned threadably onto the threaded end of said adapter, said grip and said grommet being caused to the compressed into sealing engagement with the cable end portion extending therethrough when said collar is caused to be turned onto said threaded end of said adapter.

9. The optical fiber closure of claim 1, wherein said tubular member includes at least one port through which an encapsulant may be introduced into said closure.

10. The optical fiber closure of claim 1, wherein the cross section of said tubular member normal to a longitudinal axis of the closure is circular and the ratio of the inner diameter of said tubular member to the diameter of one of the cables does not exceed a value of about 4.

11. An enclosed connective arrangement between optical fibers of two cables, said enclosed splice including:
first and second optical fiber cables each of which includes at least one optical fiber, a core tube in which said at least one optical fiber is disposed, a metallic shield and a plastic jacket, each of said cables having an end portion in which predetermined lengths of optical fiber, of the core tube and of the metallic shield extend from the jacketed cable;
an electrical bonding and support member in which is disposed the end portion of each of said cables such that an exposed portion of the shield of each said end portion is adjacent to and connected electrically to an end portion of said support member;
a connective arrangement which connects said at least one optical fiber of said one cable and said at least one optical fiber of said other cable and which is disposed in said support member;
a tubular member in which is disposed said electrical bonding and support member, said tubular member having a circular cross section normal to a longitudinal axis of the closure and having an inner diameter which is less than the product of two and a predetermined minimum radius of a path in which the fiber may be routed; and
two cable gripping and sealing means each of which is disposed at an end of said tubular member and assembled thereto, each said cable gripping and sealing means having an opening therethrough to permit a cable end portion to extend therethrough into said bonding and support member and being effective to be disposed in sealing arrangement with the cable end portion extending therethrough.

12. The enclosed connective arrangement of claim 11, wherein said bonding and support member has a cross section transverse to a longitudinal axis is of said closure which is V-shaped.

13. The enclosed connective arrangement of claim 12, wherein said tubular member includes ports therein for facilitating the introduction of encapsulant into said closure.

14. An in-line optical fiber closure for holding connections between optical fiber of one cable and optical fiber of another cable, said closure comprising:
a longitudinally extending member for supporting portions of cables to be connected and connective arrangements therefor;
a tubular member in which is disposed said longitudinally extending member and which has an internal cross section normal to a longitudinal axis of the closure, the largest dimension of the cross section being less than the product of two and a predetermined minimum radius of a path in which optical fiber may be routed without introducing excessive stress into the fiber to preclude any optical fiber being disposed in a path which includes at least a semi-circular loop having the predetermined minimum radius; and
a cable gripping and sealing assembly disposed at each end of said tubular member and secured thereto for allowing a cable end portion to be extended therethrough into said tubular member to allow optical fiber thereof to become disposed in said longitudinally extending member and for providing a clamping, sealing engagement with said cable end portion which extends therethrough to prevent the ingress of moisture into said closure.

15. A method of providing an enclosed connective arrangement of fiber of one cable to fiber of another cable, said method including the steps of:
removing outer plastic jacket, metallic shield and core tube from an end portion of each of two optical fiber cables to expose predetermined lengths of fiber, core tube and metallic shield;
moving a cable gripping and sealing assembly onto the jacketed portion of each cable;
moving a tubular member onto the jacketed portion of one cable;
securing the end portion of one cable to an electrical bonding and support member such that the exposed metallic shield thereof is adjacent to and connected electrically to one end of the support member;
securing temporarily the end portion of the other cable to the bonding and support assembly such that the exposed metallic shield thereof is spaced from an end of the support member to cause the exposed fiber thereof to overlap the exposed fiber of the one cable;
causing fiber of the one cable to be connected to fiber of the other cable through a connective arrangement without stressing the fibers;

positioning the connective arrangement within the support member while releasing the end portion of the other cable from the support member;

moving the other cable and portion along the support member in a direction away from the one cable and portion to reposition its metallic shield adjacent to an opposite end of the support member;

securing the end portion of the other cable to the support member and connecting electrically the exposed shield thereof to an end portion of the support member;

moving the tubular member to enclose the support member; and moving each cable gripping and sealing assembly toward the tubular member and securing the cable gripping and sealing assemblies to the tubular member to complete the closure and to provide a sealing engagement with the cables.

16. The method of claim 15, which also includes the step of introducing encapsulant into the tubular member.

17. The method of claim 15, wherein the step of securing the end portion of the other cable is carried out so that the connected length of each optical fiber pair is substantially without slack.

* * * * *